(12) United States Patent
Xu et al.

(10) Patent No.: US 12,464,453 B2
(45) Date of Patent: Nov. 4, 2025

(54) COMMUNICATION METHOD AND COMMUNICATION APPARATUS

(71) Applicant: HUAWEI TECHNOLOGIES CO., LTD., Shenzhen (CN)

(72) Inventors: Kai Xu, Shanghai (CN); Hongwei Wang, Shanghai (CN); Yifan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 400 days.

(21) Appl. No.: 18/069,812

(22) Filed: Dec. 21, 2022

(65) Prior Publication Data

US 2023/0126489 A1    Apr. 27, 2023

Related U.S. Application Data

(63) Continuation of application No. PCT/CN2021/101457, filed on Jun. 22, 2021.

(30) Foreign Application Priority Data

Jun. 24, 2020  (CN) .......................... 202010589129.6

(51) Int. Cl.
*H04W 52/02*  (2009.01)
*H04W 36/00*  (2009.01)

(52) U.S. Cl.
CPC ... *H04W 52/0206* (2013.01); *H04W 36/0055* (2013.01)

(58) Field of Classification Search
CPC ..................... H04W 52/0206; H04W 36/0055
See application file for complete search history.

(56) References Cited

U.S. PATENT DOCUMENTS

| 9,301,225 | B2 | 3/2016 | Comsa et al. |
| 2014/0235246 | A1* | 8/2014 | Lin .................. H04W 36/0088 455/436 |

FOREIGN PATENT DOCUMENTS

| CN | 102857980 A | 1/2013 |
| CN | 105589506 A | 5/2016 |

(Continued)

OTHER PUBLICATIONS

"Consideration on inter-RAT energy saving," 3GPP TSG RAN WG3 NR#103-bis, Xi'an, China, R3-191453, pp. 1-3, 3rd Generation Partnership Project, Valbonne, France (Apr. 8-12, 2019).

(Continued)

*Primary Examiner* — Gbemileke J Onamuti
(74) *Attorney, Agent, or Firm* — Leydig, Voit & Mayer, Ltd.

(57) ABSTRACT

This application provides a communication method and apparatus. The method may include: A cell in a first frequency range determines to enter an energy saving state. A terminal device accesses a cell in a second frequency range through cell selection. When the terminal device needs to enter the cell in the first frequency range, the cell in the second frequency range assists the terminal device in accessing the cell in the first frequency range. In this application, energy saving can be implemented through assistance between a plurality of cells. For example, the cell in the first frequency range may enter the energy saving state. Communication performance can be ensured. For example, the cell in the second frequency range may assist the terminal device in accessing the cell in the first frequency range in the energy saving state.

5 Claims, 11 Drawing Sheets

(56) References Cited

FOREIGN PATENT DOCUMENTS

| CN | 108990073 | A  | 12/2018 |
|----|-----------|----|---------|
| CN | 110267301 | A  | 9/2019  |
| EP | 2665312   | A1 | 11/2013 |
| EP | 2728929   | A1 | 5/2014  |

OTHER PUBLICATIONS

"3rd Generation Partnership Project; Technical Specification Group Radio Access Network; NR; Radio Resource Control (RRC) protocol specification (Release 16)," 3GPP TS 38.331 V16.0.0, pp. 1-835, 3rd Generation Partnership Project, Valbonne, France (Mar. 2020).

Huawei, "Summary of Rel-17 email discussion on MR-DC enhancements," 3GPP TSG RAN Meeting #86, RP-192967, Sitges, Spain, XP051834535, Total 44 pages, 3rd Generation Partnership Project, Valbonne, France (Dec. 9-12, 2019).

* cited by examiner

COMMUNICATION METHOD AND COMMUNICATION APPARATUS

CROSS-REFERENCE TO RELATED APPLICATIONS

This application is a continuation of International Application No. PCT/CN2021/101457, filed on Jun. 22, 2021, which claims priority to Chinese Patent Application No. 202010589129.6, filed on Jun. 24, 2020. The disclosures of the aforementioned applications are hereby incorporated by reference in their entireties.

TECHNICAL FIELD

This application relates to the communications field, and more specifically, to a communication method and apparatus.

BACKGROUND

In a communication process, power consumption of a base station mainly includes power amplifier power consumption, radio frequency power consumption, and building baseband unit power consumption. As a quantity of transceiver links increases, total power consumption of the base station increases exponentially. Therefore, a symbol power saving manner can be used to reduce power consumption and save energy.

However, in some scenarios, for example, in a new radio (NR) system, considering that a synchronization signal/physical broadcast channel block (SS/PBCH block) message, a system information block, a paging message, and the like need to be transmitted all the time, a large quantity of downlink sending slots are occupied. As a result, a base station cannot save energy in a symbol power saving manner.

SUMMARY

This application provides a communication method and apparatus, so that a quantity of sent system broadcast messages can be reduced through coordination and cooperation of a plurality of co-coverage cells in different frequency bands, and more downlink slots can be reserved to achieve an objective of energy saving.

According to a first aspect, a communication method is provided. The method includes: A cell in a first frequency range determines to enter an energy saving state. When a terminal device needs to access the cell in the first frequency range, a cell in a second frequency range assists the cell in the first frequency range, so that the terminal device accesses the cell in the first frequency range.

For example, after the cell in the first frequency range enters the energy saving state, sending of an RMSI/OSI/paging message is stopped, and/or only an SSB message is sent.

For example, the cell in the first frequency range may represent a cell at a capacity layer, and the cell in the second frequency range may represent a cell at a coverage layer.

Based on the foregoing technical solution, in the energy saving state of the cell in the first frequency range, the terminal device may access the cell in the first frequency range with assistance of the cell in the second frequency range. Therefore, the cell in the first frequency range may enter the energy saving state, and with assistance of the cell in the second frequency range, a coordinated energy saving effect can be achieved without losing a normal communication capability.

With reference to the first aspect, in some implementations of the first aspect, that a cell in a first frequency range enters an energy saving state includes: The cell in the first frequency range does not support functions of camping and initial access.

Based on the foregoing technical solution, when the functions of camping and initial access are separated from the cell in the first frequency range, occasions for sending some messages (such as RMSI/OSI/paging) can be reduced. Therefore, a quantity of sent system broadcast messages can be reduced, and more downlink slots can be reserved for saving energy in the symbol power saving manner. For example, the cell in the first frequency range may enter the energy saving state. In addition, the functions of camping and initial access may be responsible for the cell in the second frequency range. After accessing the cell in the second frequency range, the terminal device may access the cell in the first frequency range with assistance of the cell in the second frequency range.

With reference to the first aspect, in some implementations of the first aspect, that a cell in a second frequency range assists the cell in the first frequency range, so that the terminal device accesses the cell in the first frequency range includes: The cell in the second frequency range sends a handover indication to the terminal device, to indicate the terminal device to hand over to the cell in the first frequency range.

With reference to the first aspect, in some implementations of the first aspect, that a cell in a second frequency range assists the cell in the first frequency range, so that the terminal device accesses the cell in the first frequency range includes: The cell in the second frequency range adds the cell in the first frequency range as a secondary cell or a secondary carrier.

According to a second aspect, a communication method is provided. The method includes: A cell in a first frequency range determines to enter an energy saving state. When a terminal device needs to access the cell in the first frequency range, a cell in a second frequency range assists the cell in the first frequency range, so that the terminal device accesses the cell in the first frequency range.

For example, after the terminal device accesses the cell in the first frequency range, the cell in the first frequency range disables the energy saving state.

Based on the foregoing technical solution, the cell in the second frequency range may be responsible for functions of camping and initial access. After accessing the cell in the second frequency range, the terminal device may access the cell in the first frequency range with assistance of the cell in the second frequency range. Therefore, the cell in the first frequency range may enter the energy saving state, and with assistance of the cell in the second frequency range, a coordinated energy saving effect can be achieved without losing a normal communication capability.

With reference to the second aspect, in some implementations of the second aspect, that a cell in a first frequency range enters an energy saving state includes: The cell in the first frequency range does not support functions of camping and initial access.

According to a third aspect, a communication method is provided. The method includes: A terminal device accesses a cell in a second frequency range. When the terminal device needs to access a cell in a first frequency range, and the cell in the first frequency range is in an energy saving state, the terminal device accesses the cell in the first frequency range with assistance of the cell in the second frequency range, where when the cell in the first frequency range is in the energy saving state, the cell in the first frequency range does not support functions of camping and initial access.

With reference to the third aspect, in some implementations of the third aspect, that the terminal device accesses the cell in the first frequency range with assistance of the cell in the second frequency range includes: The terminal device receives a handover indication from the cell in the second frequency range, and the terminal device hands over to the cell in the first frequency range based on the handover indication.

According to a fourth aspect, a communication apparatus is provided. The communication apparatus is configured to perform the communication methods provided in the first aspect to the third aspect. Specifically, the communication apparatus may include a module configured to perform the communication methods provided in the first aspect to the third aspect.

According to a fifth aspect, a communication apparatus is provided. The communication apparatus includes a processor. The processor is coupled to a memory, and may be configured to execute instructions in the memory, to implement the communication method in any one of the third aspect or the possible implementations of the third aspect. Optionally, the communication apparatus further includes the memory. Optionally, the communication apparatus further includes a communication interface, the processor is coupled to the communication interface, and the communication interface is configured to input and/or output information. The information includes at least one of the instructions and data.

In an implementation, the communication apparatus is a terminal device. When the communication apparatus is the terminal device, the communication interface may be a transceiver or an input/output interface.

In another implementation, the communication apparatus is a chip or a chip system. When the communication apparatus is the chip or the chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system disposed in a terminal device.

Optionally, the transceiver may be a transceiver circuit. Optionally, the input/output interface may be an input/output circuit.

According to a sixth aspect, a communication apparatus is provided. The communication apparatus includes a processor. The processor is coupled to a memory, and may be configured to execute instructions in the memory, to implement the communication method in any one of the first aspect or the second aspect, or the possible implementations of the first aspect or the second aspect. Optionally, the communication apparatus further includes the memory. Optionally, the communication apparatus further includes a communication interface, the processor is coupled to the communication interface, and the communication interface is configured to input and/or output information. The information includes at least one of the instructions and data.

In an implementation, the communication apparatus is a network device, for example, a cell in a first frequency range and/or a cell in a second frequency range, or a network device to which the cell in the first frequency range belongs and/or a network device to which the cell in the second frequency range belongs. When the communication apparatus is the network device, the communication interface may be a transceiver or an input/output interface.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system disposed in a network device.

Optionally, the transceiver may be a transceiver circuit. Optionally, the input/output interface may be an input/output circuit.

According to a seventh aspect, a computer-readable storage medium is provided. The computer-readable storage medium stores a computer program. When the computer program is executed by a communication apparatus, the communication apparatus is enabled to implement the communication method in any one of the first aspect to the third aspect or the possible implementations of the first aspect to the third aspect.

According to an eighth aspect, a computer program product including instructions is provided. When the instructions are executed by a computer, a communication apparatus is enabled to implement the communication methods provided in the first aspect to the third aspect.

According to a ninth aspect, a communication system is provided, and includes a cell in a first frequency range (or a network device to which the cell in the first frequency range belongs) and a terminal device: or includes a cell in a first frequency range (or a network device to which the cell in the first frequency range belongs) and a cell in a second frequency range (or a network device to which the cell in the second frequency range belongs): or includes a cell in a first frequency range (or a network device to which the cell in the first frequency range belongs), a cell in a second frequency range (or a network device to which the cell in the second frequency range belongs), and a terminal device.

DESCRIPTION OF EMBODIMENTS

The following describes the technical solutions in this application with reference to the accompanying drawings.

The technical solutions in embodiments of this application may be applied to various communication systems, for example, a 5th generation (5G) system, an NR system, a long term evolution (LTE) system, an LTE frequency division duplex (FDD) system, an LTE time division duplex (TDD) system, or a universal mobile communications system (UMTS).

Figure 1:
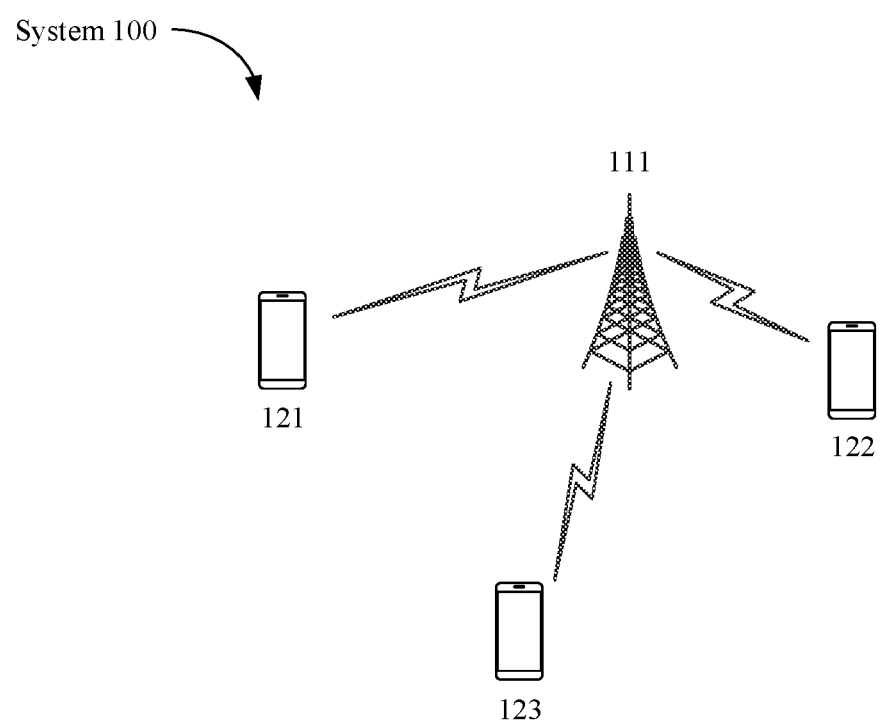
FIG. 1 is a schematic diagram of a wireless communication system 100 applicable to an embodiment of this application.

FIG. 1 is a schematic diagram of a wireless communication system 100 applicable to an embodiment of this application. As shown in FIG. 1, the wireless communication system 100 may include at least one network device, for example, a network device 111 shown in FIG. 1. The wireless communication system 100 may further include at least one terminal device, for example, a terminal device 121 to a terminal device 123 shown in FIG. 1. A plurality of antennas may be configured for each of the network device and the terminal device. The network device and the terminal device may communicate with each other by using a multi-antenna technology.

When the network device communicates with the terminal device, the network device may manage one or more cells, and there may be an integer quantity of terminal devices in one cell. Optionally, the network device 111 and the terminal device 121 to the terminal device 123 form a single-cell communication system. Without loss of generality, a cell is denoted as a cell #1. The network device 111 may be a network device in the cell #1. In other words, the network device 111 may serve a terminal device (for example, the terminal device 121) in the cell #1.

It should be noted that a cell may be understood as an area within coverage of radio signals of the network device.

Figure 2:
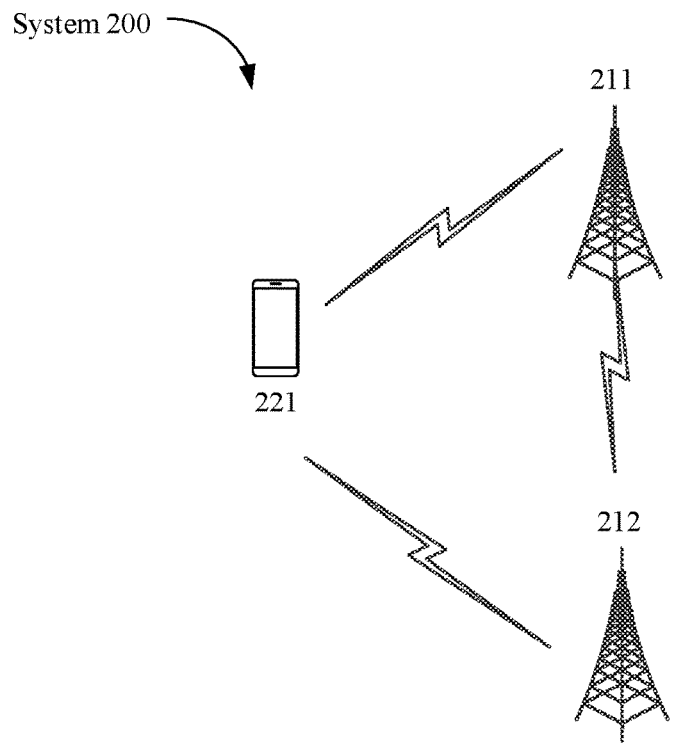
FIG. 2 is another schematic diagram of a wireless communication system 100 applicable to an embodiment of this application.

FIG. 2 is another schematic diagram of a wireless communication system 200 applicable to an embodiment of this application. As shown in FIG. 2, the wireless communication system 200 may include one terminal device, for example, a terminal device 221 in FIG. 2. The wireless communication system 200 may further include a plurality of network devices, for example, a network device 211 and a network device 212 in FIG. 2. The terminal device 221 in FIG. 2 may simultaneously communicate with the network device 221 and the network device 212. In other words, the network device 211 and the network device 212 may jointly serve the terminal device 221.

Figure 3:
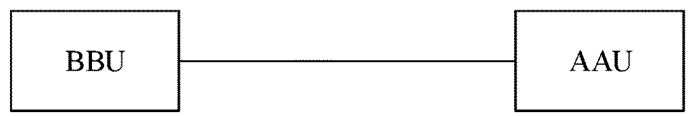
FIG. 3 is a diagram of a system architecture applicable to this application.

FIG. 3 is a diagram of a system architecture applicable to this application. The architecture may include, for example, a building baseband unit (BBU) and an active antenna unit (AAU).

Figure 4:
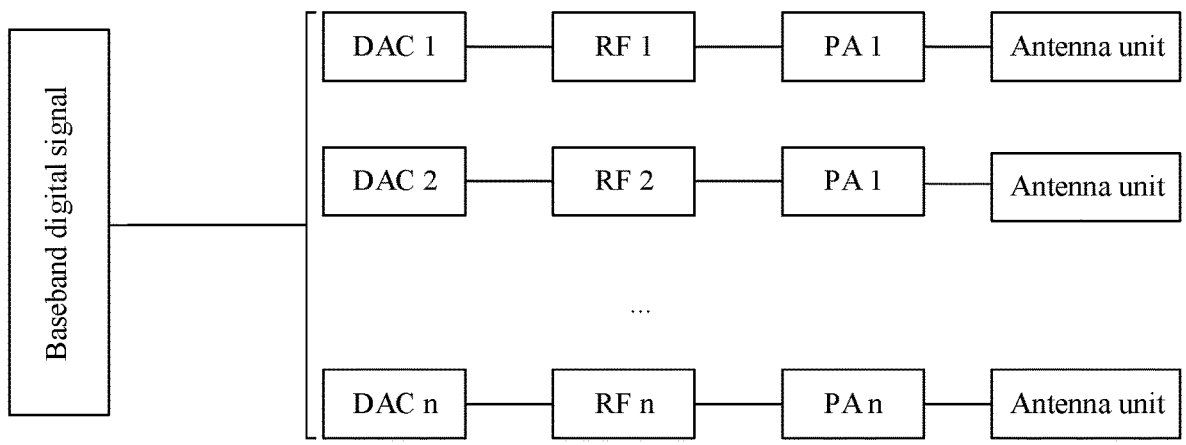
FIG. 4 is a framework diagram of a mobile communication system applicable to this application.

FIG. 4 is a framework diagram of a mobile communication system applicable to this application. As shown in the figure, in the mobile communication system, power consumption of a network device, such as power consumption of a base station, includes power amplifier (PA) power consumption, radio frequency (RF) power consumption, and BBU power consumption. As a quantity of transceiver (TRX) links increases, total power consumption of the base station increases exponentially. For example, a quantity of antenna units of massive multiple-input multiple-output (Massive MIMO) increases, each antenna unit has a PA and an RF unit, the quantity of TRX links increases, and calculation power consumption of BBUs increases with an increase in the quantity of TRX links. As a result, the total power consumption of the base station increases accordingly. A symbol power saving principle can resolve the preceding problem. For details, refer to the following descriptions.

It should be understood that FIG. 1 to FIG. 4 are merely examples for description, and this application is not limited thereto. For example, embodiments of this application may be further applied to a random access scenario (for example, a 5G NR random access procedure).

In embodiments of this application, both a cell in a first frequency range and a cell in a second frequency range may be cells served by one network device, for example, both are cells served by the network device 111 in FIG. 1. Alternatively, a cell in a first frequency range and a cell in a second frequency range may be cells served by different network devices. For example, the cell in the first frequency range is a cell served by the network device 112 in FIG. 2, and the cell in the second frequency range is a cell served by the network device 113 in FIG. 2.

It should be understood that the network device in the wireless communication system may be any device that has a wireless transceiver function. The device includes but is not limited to: an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. The device may alternatively be a gNB or a transmission point (TRP or TP) in a 5G system, for example, an NR system or one antenna panel or a group of antenna panels (including a plurality of antenna panels) of a base station in the 5G system, or the device may alternatively be a network node that constitutes a gNB or a transmission point, for example, a baseband unit (BBU) or a distributed unit (DU).

In some deployments, the gNB may include a central unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (CN). This is not limited in this application.

It should be further understood that the terminal device in the wireless communication system may also be referred to as a user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application.

For ease of understanding of embodiments of this application, the following first briefly describes several terms in this application.

Downlink common channels in a 5th generation mobile communication technology (5th Generation, 5G) new radio (NR) system may be classified into a synchronization signal and physical broadcast channel block (Synchronization Signal and PBCH block, SSB), paging information (paging), and a system information block (SIB). The SIB may include remaining minimum system information (RMSI) and other system information (OSI).

1. SSB

In NR, a primary synchronization signal (PSS)/secondary synchronization signal (SSS) and a PBCH are combined together, occupy four consecutive symbols in time domain, and occupy 20 RBs in frequency domain, to form an SSB. A same beam sending manner is used for a same SSB. It may be understood that, in time domain, one SSB may include, for example, four OFDM symbols, and in frequency domain, one SSB may include, for example, 240 consecutive subcarriers, that is, 20 consecutive RBs.

Figure 5:
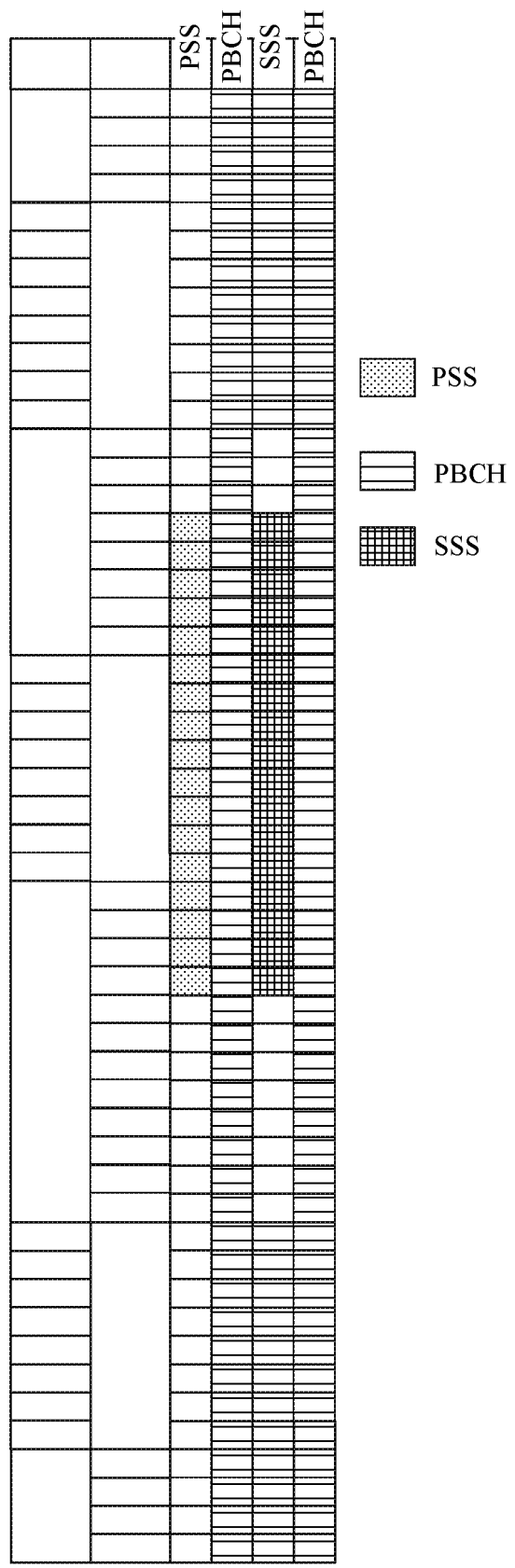
FIG. 5 is a diagram of time domain resources occupied by a PSS/SSS and a PBCH.

FIG. 5 is a schematic diagram of time domain resources occupied by a PSS/SSS and a PBCH. As shown in the figure, different from an LTE system in which locations of synchronization sequences PSS, SSS, and PBCH on time-frequency resources are discrete, time-frequency resource locations of the PSS, the SSS, and the PBCH are redesigned in NR, so that the PSS, the SSS, and the PBCH are more compact and form a whole, which is referred to as an SSB. The SSB occupies four OFDM symbols in time domain and 240 subcarriers in frequency domain. In this compact structure, once the synchronization sequence is detected, broadcast demodulation may be performed, to accelerate an access speed of a terminal and reduce a network delay of a system.

Figure 6:
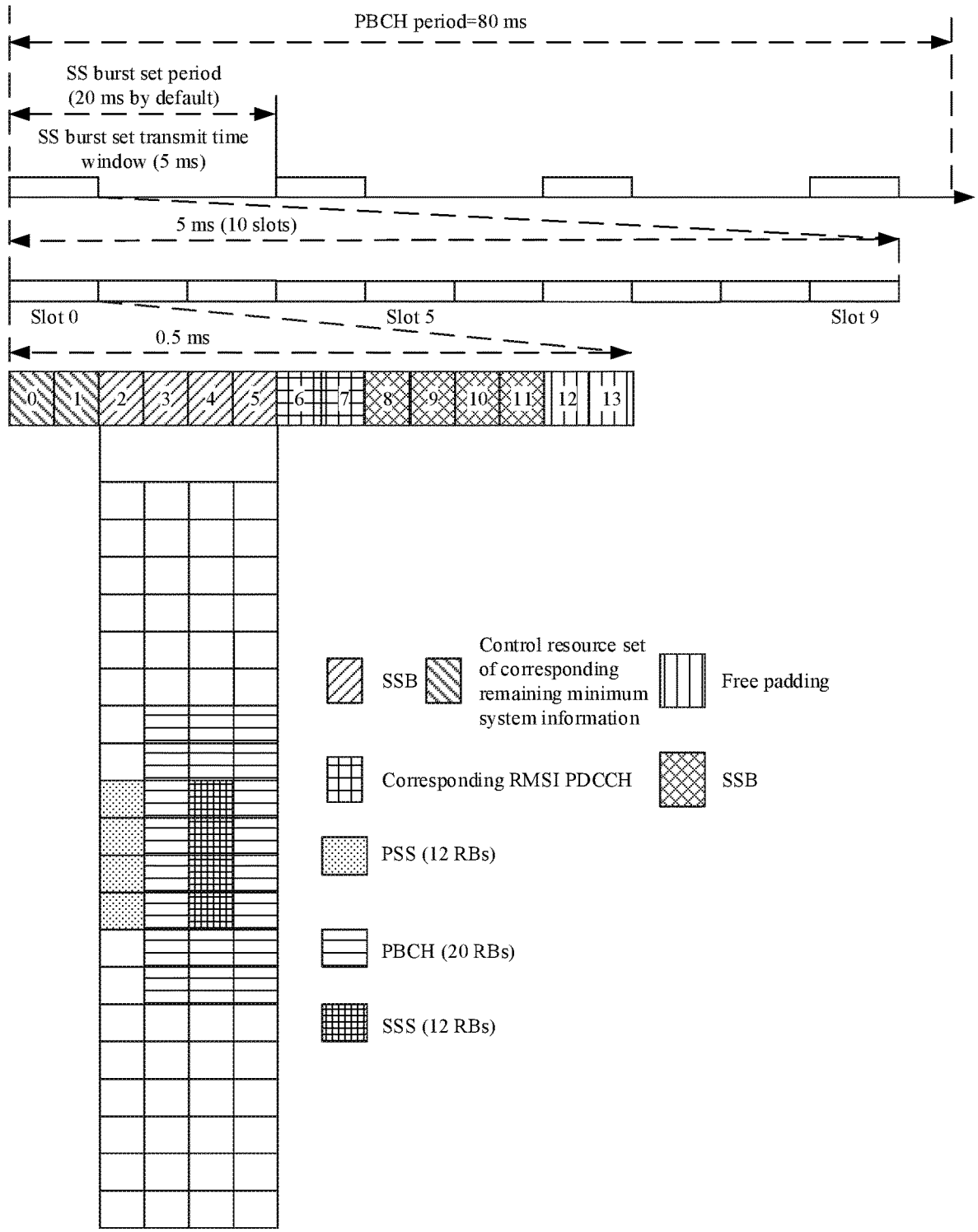
FIG. 6 is a diagram of a mechanism for sending a PSS/SSS and a PBCH.

FIG. 6 is a schematic diagram of a mechanism for sending a PSS/SSS and a PBCH. As shown in the figure, it is assumed that one PBCH period is 80 ms, and one SS burst set transmit window is 5 ms, that is, 10 slots. Locations of time domain resources occupied by the PSS, the PBCH, the SSS, and the like can be learned from FIG. 4. One slot includes a control resource set of corresponding remaining minimum system information, an SSB, a corresponding RMSI PDCCH, and a free padding time domain resource. Time domain resources of the PSS, the SSS, and the PBCH are compactly combined to form an SSB.

2. Cell

The cell is described by a higher layer from a perspective of resource management, mobility management, or a service unit. Coverage of each network device may be divided into one or more cells, and the cell may be considered to include a frequency domain resource. The cell may be an area within coverage of a wireless network of the network device. In embodiments of this application, different cells may correspond to different network devices. For example, a network device in a cell #1 and a network device in a cell #2 may be different network devices, for example, base stations. That is, the cell #1 and the cell #2 may be managed by different base stations. In this case, the cell #1 and the cell #2 may be referred to as being deployed at a collaborated site or a same site. The network device in the cell #1 and the network device in the cell #2 may also be different radio frequency processing units of a same base station, for example, radio remote units (radio remote units, RRUs). In other words, the cell #1 and the cell #2 may be managed by a same base station and have a same baseband processing unit and a same intermediate frequency processing unit, but have different radio frequency processing units. This is not particularly limited in this application.

In embodiments of this application, the cell #1 may be the cell in the first frequency range, and the cell #2 may be the cell in the second frequency range.

3. Dual Connectivity (DC)

Dual connectivity (DC): A terminal device may simultaneously have communication connections to two network devices, and may receive and send data, which may be referred to as dual connectivity. One of the two network devices (for example, base stations) may be responsible for exchanging a radio resource control message with the terminal device, and responsible for interacting with a core network control plane entity. In this case, the network device may be referred to as a master node (MN). For example, the master node may be an MeNB or an MgNB, but is not limited thereto. In this case, the other network device may be referred to as a secondary node (SN). For example, the secondary node may be an SeNB or an SgNB, but is not limited thereto. The master node is a control plane anchor. To be specific, the terminal device establishes an RRC connection to the master node, and the master node establishes a control plane connection to a core network. In DC, a plurality of serving cells in the master node form a master cell group (MCG), including one primary cell (PCell) and optionally, one or more secondary cells (PCell). A plurality of serving cells in the secondary node form a secondary cell group (SCG), including one primary secondary cell (PSCell, which may also be referred to as a special cell) and optionally, one or more Scells. The serving cell is a cell that is configured by a network for the terminal device to perform uplink and downlink transmission.

In embodiments of this application, the cell in the first frequency range and the cell in the second frequency range may serve the terminal device in a DC manner.

4. Carrier Aggregation (CA)

Carrier aggregation (CA): To efficiently utilize fragmented spectrums, a system supports aggregation between different component carriers. A technology that aggregates two or more carriers to support a larger transmission bandwidth may be referred to as carrier aggregation.

In the carrier aggregation technology, a plurality of component carriers (component carriers, CCs, which are referred to as member carriers, constituent carriers, carriers, or the like) may be configured for a terminal device, and each CC may correspond to an independent cell. A CC may be equivalent to a cell. For example, a primary cell corresponds to a primary CC (which is referred to as a primary carrier), and may be a cell for establishing an initial connection for a terminal, a cell for reestablishing an RRC connection, or a primary cell specified in a handover process. A secondary cell corresponds to a secondary CC (which is referred to as a secondary carrier), and may be a cell that is added during RRC reconfiguration and that is used to provide additional radio resources.

For a terminal device in connected mode, if carrier aggregation is not configured, the terminal device has one serving cell, or if carrier aggregation is configured, the terminal device may have a plurality of serving cells, which may be referred to as a serving cell set. For example, the serving cell set of the terminal device includes a primary cell and a secondary cell. In other words, in a scenario in which carrier aggregation is configured, the serving cell set includes at least one primary cell and at least one secondary cell. In other words, the terminal device for which carrier aggregation is configured may perform data transmission with one PCell and a plurality of SCells.

In embodiments of this application, the cell in the first frequency range and the cell in the second frequency range may serve the terminal device in a CA manner.

5. Symbol Power Saving Principle

When no valid data is transmitted, a power amplifier is powered off to save energy. In an actual communication process, a base station is not always in a state of maximum traffic at any moment. Therefore, a symbol in a subframe is not padded with valid information at any moment. After symbol power saving is enabled, the power amplifier may be powered off during remaining symbol time without transmission of valid information, to save energy.

Figure 7:
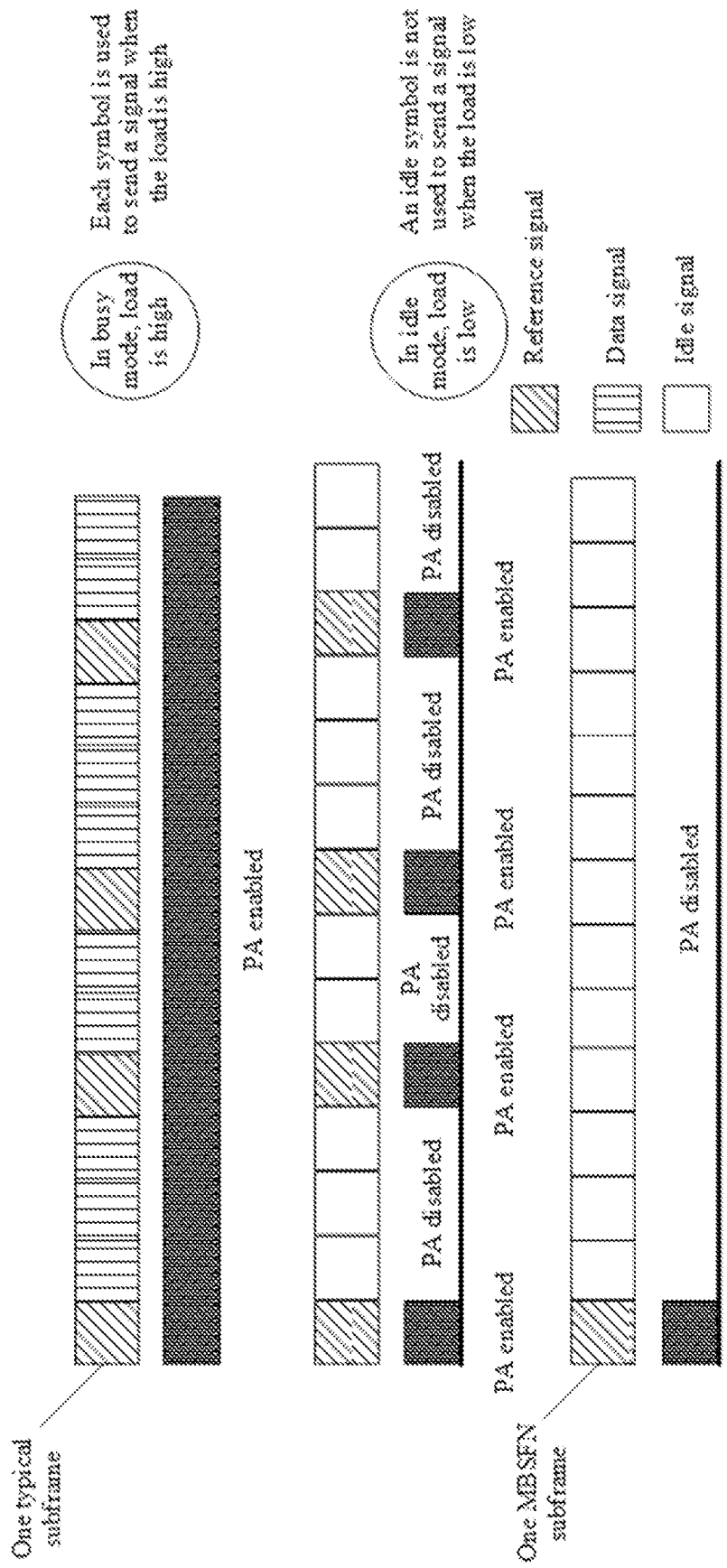
FIG. 7 is a schematic diagram of a symbol power saving principle.

FIG. 7 is a schematic diagram of a symbol power saving principle. As shown in the figure, in a high-load working mode, when content of downlink transmission performed by a base station is a reference symbol and a data symbol, a PA keeps in an on state. In a low-load working mode, when content of downlink transmission performed by the base station is a reference symbol, the PA is in an on state, or when content of downlink transmission performed by the base station is an idle symbol, the PA is in an off state. Therefore, an important means of energy saving of the base station is to reserve more idle moments for not performing downlink transmission, so that a larger energy saving gain can be obtained.

Then, in a low-load scenario, sending of SSB. SIB, and paging messages of the base station occupies a large quantity of downlink sending slots. As a result, the base station cannot save energy in a symbol power saving manner. Details are described below:

A master system module (master information block, MIB) transmitted on a broadcast channel (BCH) includes only very limited system information, and more system information is notified to a terminal device (UE) by using a SIB message transmitted on a downlink shared channel (DL-SCH). For each type of SIB, information in a radio resource control (RRC) message is all information to be notified to the UE.

Both a SIB 1 and system information (SI) are transmitted on a physical downlink shared channel (PDSCH), and RBs (locations in frequency domain), transmission formats, and the like of the PDSCH occupied by the SIB 1 and the SI message are dynamically scheduled, and are indicated by a physical downlink control channel (PDCCH) scrambled by a system information-radio network temporary identifier (SI-RNTI). A pdcch-ConfigSIB1 field in a MIB message indicates a PDCCH time-frequency resource of the SIB 1. To be specific, the UE needs to first perform blind detection on the PDCCH through SI-RNTI scrambling in a subframe indicated by the pdcch-ConfigSIB1, to know whether there is an SI message in the subframe. Table 1 shows a comparison between NR system information content and long term evolution (long term evolution, LTE) system information content.

TABLE 1

| Type | LTE | NR |
|------|-----|-----|
| MIB | Necessary information for a user to access a network | Necessary information for a user to access a network |
| SIB 1 | Cell access information OSI scheduling information | Cell access information OSI scheduling information Access restriction parameter |
| SIB 2 | Access restriction parameter and common channel parameter | Common parameter for cell reselection |
| SIB 3 | Common information for cell reselection | Intra-frequency neighboring cell reselection information |
| SIB 4 | Intra-frequency neighboring cell reselection information | Inter-frequency neighboring cell reselection information |
| SIB 5 | Inter-frequency neighboring cell reselection information | Inter-RAT cell reselection information (E-UTRAN) |
| SIB 6 | Inter-RAT cell reselection information (UTRAN) | ETWS primary notification information |
| SIB 7 | Inter-RAT cell reselection information (GERAN) | ETWS assistance notification information |
| SIB 8 | Inter-RAT cell reselection information (CDMA2000) | CMAS alarm notification information |
| SIB 9 | Home eNodeB name | GPS & UTC information |
| SIB 10 | ETWS primary notification information | |
| SIB 11 | ETWS assistance notification information | |
| SIB 12 | CMAS alarm notification information | |

6. Paging Message

When downlink data needs to be sent to a UE in idle mode, a mobility management node (MME) sends a paging message (sent by the MME to an eNB) to all evolved NodeBs (eNBs) in all tracking areas (TAs) with which the UE registers, and then the eNB sends a paging message through an air interface to page the UE. After receiving the paging message, the UE in idle mode may initiate an RRC connection establishment procedure to receive a call. Paging functions are described as follows:

(1) A call request is sent to the UE in RRC_IDLE mode, which is triggered by the MME. Then, the UE initiates random access to achieve uplink time synchronization.

(2) All UEs are notified of a system information change, which is triggered by the eNB. The UE does not always parse system information. Instead, the UE re-parses system information after receiving system information change information.

(3) The UE is notified to receive an ETWS (earthquake and tsunami warning system) notification (SIB 10, SIB 11).

(4) The UE is notified to receive a CMAS (commercial mobile alert system) notification (SIB 12).

Content of the paging message is sent to the UE through a location of a PDSCH resource, and the PDSCH resource is indicated by a PDCCH scrambled by a paging-radio network temporary identifier (P-RNTI). To be specific, to obtain the paging message, the UE first needs to periodically wake up to monitor the PDCCH channel scrambled by the P-RNTI, and then parse downlink control information (DCI) to further obtain a time-frequency location of a PDSCH channel. Finally, the UE parses the content of the paging message at the location corresponding to the PDSCH channel.

It should be understood that the foregoing enumerated content of each message is merely an example for description, and this is not limited in embodiments of this application.

It can be learned from the foregoing that the SSB, SIB, and paging messages sent by the network device occupy the large quantity of downlink sending slots. As a result, the network device cannot save energy in the symbol power saving manner.

In view of this, this application provides a solution. A quantity of sent system broadcast messages is reduced through coordination and cooperation of a plurality of co-coverage cells in different frequency bands, and more downlink slots are reserved for saving energy in the symbol power saving manner.

Figure 8:
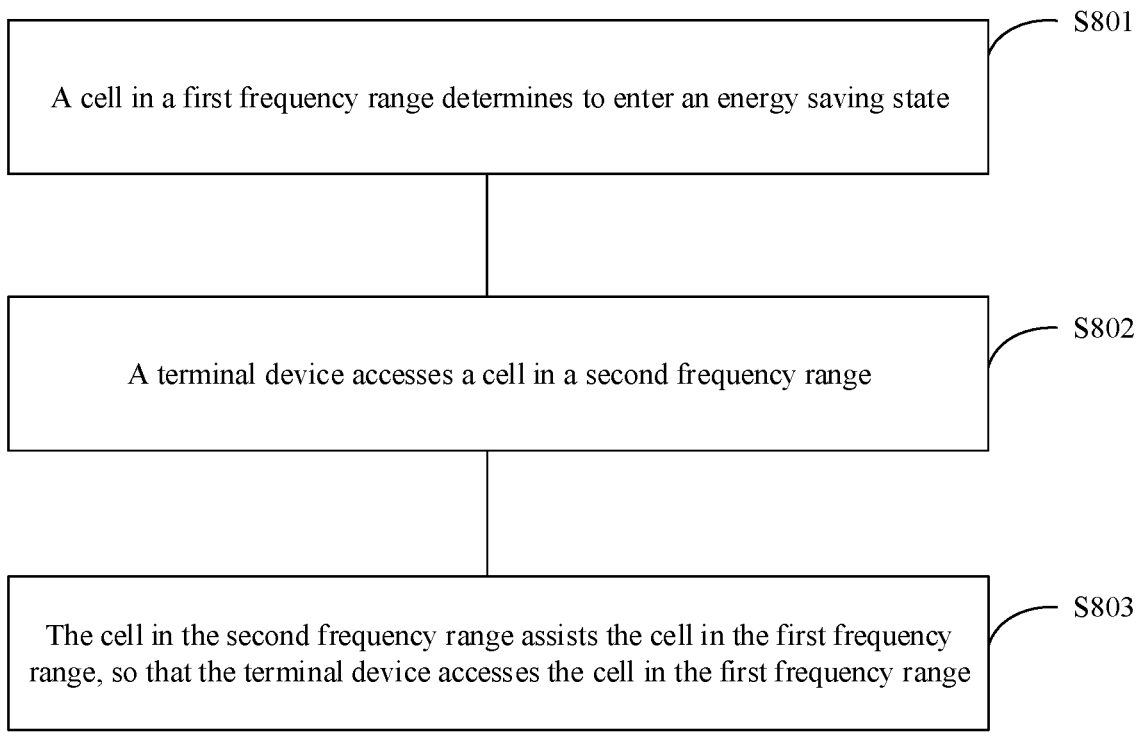
FIG. 8 is a schematic block diagram of a communication method applicable to an embodiment of this application.

FIG. 8 is a schematic block diagram of a communication method applicable to an embodiment of this application. The method 800 may include the following steps.

S801. A cell in a first frequency range determines to enter an energy saving state.

S802. A terminal device accesses a cell in a second frequency range.

S803. The cell in the second frequency range assists the cell in the first frequency range, so that the terminal device accesses the cell in the first frequency range.

According to this embodiment of this application, the cell in the first frequency range may enter the energy saving state. When the terminal device accesses the cell, in other words, the cell serves the terminal device, the terminal device may access the cell in the first frequency range with assistance of the cell in the second frequency range. Therefore, energy saving can be implemented, and communication performance can also be ensured, to improve user experience.

In the following embodiment, for differentiation and without loss of generality, a cell A represents the cell in the first frequency range, and a cell B represents the cell in the second frequency range. It should be understood that in the following, the cell A may be replaced with a network device to which the cell A belongs, and the cell B may be replaced with a network device to which the cell B belongs.

For example, the cell in the first frequency range may represent a cell at a capacity layer, that is, the cell A represents the cell at the capacity layer; and the cell in the second frequency range may represent a cell at a coverage layer, that is, the cell B represents the cell at the coverage layer.

A current base station networking structure is multi-band networking, and a networking manner may be LTE and NR co-coverage networking or new radio-time division duplex (NR-TDD) and new radio-frequency division duplex (NR-FDD) co-coverage networking. Generally, in multi-band/multi-frequency carrier co-coverage networking, one or more frequency bands (usually low frequency bands) are set as the capacity layer, and a remaining frequency band is set as the coverage layer. Alternatively, it may be understood that the cell A may represent a cell in a low frequency band, and the cell B is a cell in a remaining frequency band.

For another example, the cell A is a cell in gNB TDD, and the cell B is a cell in gNB FDD.

For still another example, the cell A is a cell in gNB SA/NSA, and the cell B is a cell served by an eNB.

It should be understood that the cell A and the cell B may alternatively have other forms. This is not limited herein.

Optionally, after entering the energy saving state, the cell A stops sending an RMSI/OSI/paging message; and/or after entering the energy saving state, the cell A sends only an SSB message.

Table 2 shows functions of system information on NR downlink common channels.

TABLE 2

| Message | Camping | Initial access | Handover | Connected mode |
|---|---|---|---|---|
| SSB | ✓ | ✓ | ✓ | ✓ |
| RMSI | ✓ | ✓ | | System information update |
| OSI | | ✓ | | System information update |
| Paging | ✓ | | | Send only a PDCCH |

As shown in Table 2, the SSB has functions of camping, initial access, handover, and a connected mode, the RMSI has functions of camping, initial access, and system information update in connected mode, the OSI has functions of initial access and system information update in connected mode, and the paging has functions of camping and sending only a PDCCH in connected mode. When the functions of camping and initial access are separated from the cell A, occasions for sending the RMSI/OSI/paging can be reduced, and even the foregoing messages do not need to be sent.

Therefore, according to this embodiment of this application, a quantity of sent system broadcast messages can be reduced, and more downlink slots can be reserved for saving energy in the symbol power saving manner.

In addition, the cell B (for example, the cell at the coverage layer) may be responsible for the functions of camping and initial access. After accessing the cell B, the terminal device may access the cell A with assistance of the cell B. It should be understood that the assistance is mentioned for a plurality of times in this embodiment of this application. The assistance indicates that if the terminal device needs to access the cell A that enters the energy saving state, the terminal device may access the cell A with assistance of another cell (that is, the cell B, for example, the cell at the coverage layer).

Optionally, the cell A may enter the energy saving state in any one of the following cases: load of the network device (for example, a base station) to which the cell A belongs is less than a preset first threshold, and a quantity of users accessing the cell A or users of the network device (for example, the base station) to which the cell A belongs is less than a preset second threshold.

The preset first threshold and the preset second threshold may be pre-specified, for example, defined in a protocol, may be configured by the network device, or may be empirical values determined based on a historical communication status.

Figure 9:
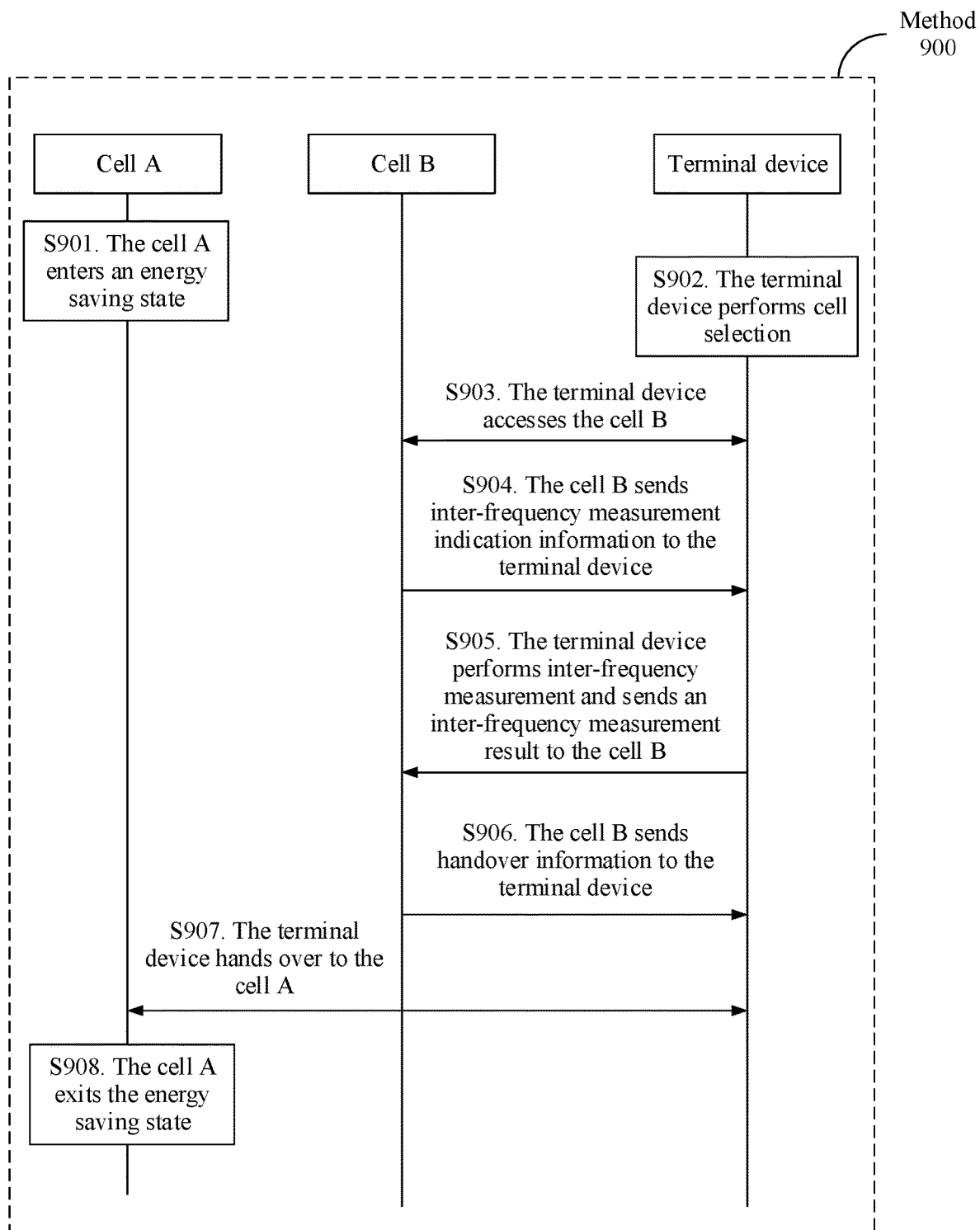
FIG. 9 is a schematic flowchart of a communication method applicable to an embodiment of this application.
Figure 10:
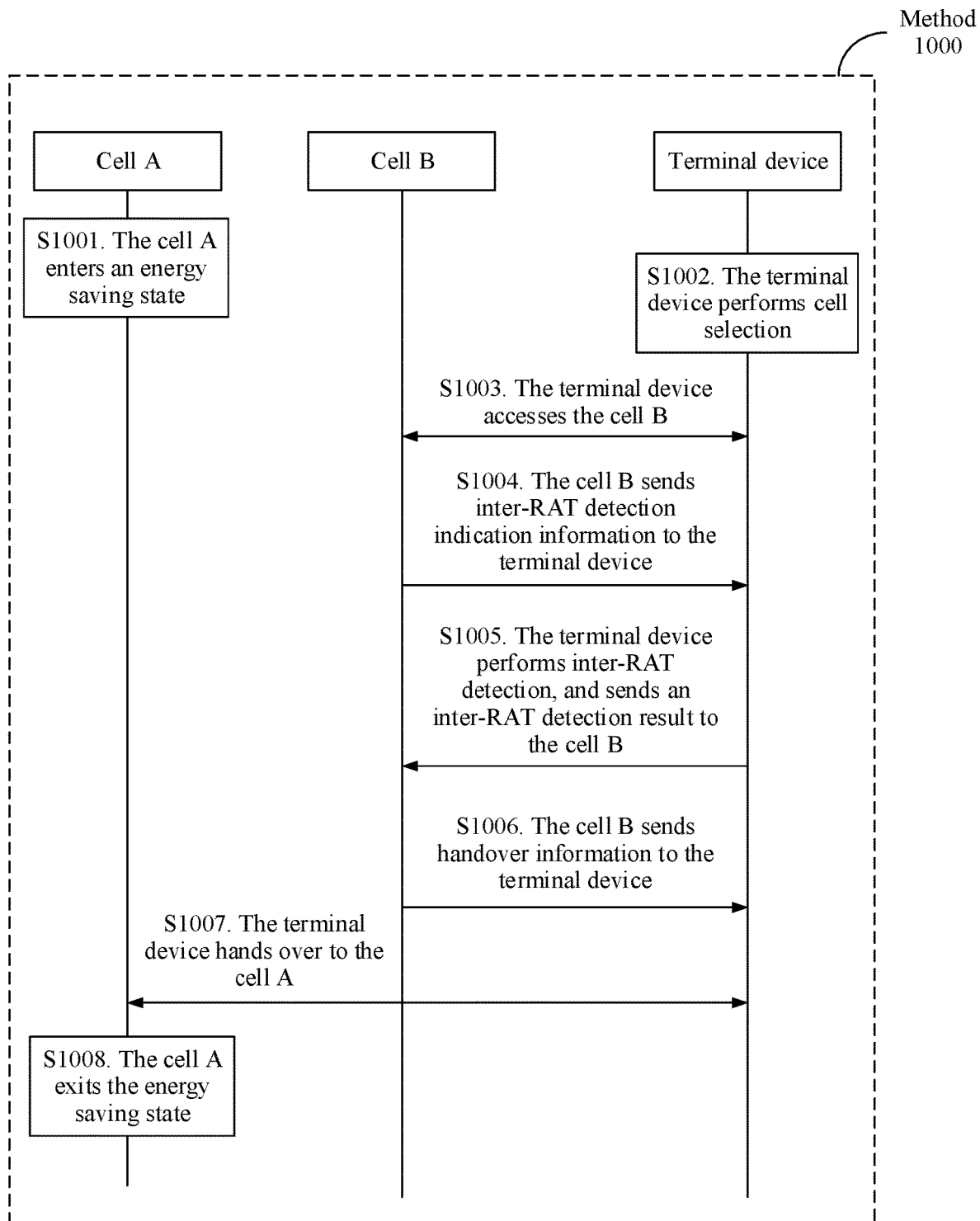
FIG. 10 is a schematic flowchart of a communication method according to another embodiment of this application.

With reference to FIG. 9 and FIG. 10, the following describes two possible procedures applicable to embodiments of this application.

FIG. 9 is a schematic flowchart of a communication method applicable to an embodiment of this application. The method 900 may include the following steps.

S901. A cell A enters an energy saving state.

For example, the cell A represents a cell at a capacity layer, and a cell B represents a cell at a coverage layer. For another example, the cell A is a cell in gNB TDD, and a cell B is a cell in gNB FDD.

For descriptions of the cell A and the cell B, refer to the descriptions in the method 800. Details are not described herein again.

For example, the cell A may enter the energy saving state in any one of the following cases: load of a network device (for example, a base station) to which the cell A belongs is less than a preset first threshold, and a quantity of users accessing the cell A or users of the network device (for example, the base station) to which the cell A belongs is less than a preset second threshold.

The preset first threshold and the preset second threshold may be pre-specified, for example, defined in a protocol, may be configured by the network device, or may be empirical values determined based on a historical communication status.

Optionally, after entering the energy saving state, the cell A stops sending an RMSI/OSI/paging message; and/or after entering the energy saving state, the cell A sends only an SSB message. When functions of camping and initial access are separated from the cell A, occasions for sending the RMSI/OSI/paging can be reduced, and even the foregoing messages do not need to be sent.

Therefore, according to this embodiment of this application, a quantity of sent system broadcast messages can be reduced, and more downlink slots can be reserved for saving energy in the symbol power saving manner.

The cell B (for example, the cell at the coverage layer) may be responsible for the functions of camping and initial access. After accessing the cell B, a terminal device may access the cell A with assistance of the cell B.

S902. The terminal device performs cell selection.

For example, the terminal device in idle mode performs access selection on a cell. The cell A is in the energy saving state. Therefore, after reading an SSB message of the network device to which the cell A belongs, the terminal device finds that the cell A cannot be camped on.

S903. The terminal device accesses the cell B.

As described above, the cell A enters the energy saving state. If the terminal device needs to access the cell A, the terminal device may access the cell A with assistance of the cell B.

S904. The cell B sends inter-frequency measurement indication information to the terminal device, and correspondingly, the terminal device receives the inter-frequency measurement indication information.

The terminal device may perform inter-frequency measurement based on an indication of the cell B.

S905. The terminal device performs inter-frequency measurement and sends an inter-frequency measurement result to the cell B.

S906. The cell B sends handover information to the terminal device.

The cell B may determine, based on the inter-frequency measurement result reported by the terminal device, whether the terminal device needs to hand over to the cell A.

When the cell B determines, based on the inter-frequency measurement result reported by the terminal device, that the terminal device may hand over to the cell A, the cell B may send a handover indication to the terminal device, for example, indicate to perform inter-frequency handover or add a secondary carrier.

It should be understood that the foregoing is merely an example for description, and this is not limited. For example, the cell B may alternatively determine, based on a size of a to-be-transmitted data volume of the terminal device, whether to send the handover information to the terminal device. For example, when a size of a data volume of the terminal device is greater than a preset threshold, the cell B may send a handover indication to the terminal device, for example, indicate to perform inter-frequency handover or add a secondary carrier.

It can be learned from the foregoing that, in this embodiment of this application, if the terminal device needs to access the cell A, the terminal device may accept assistance of a serving cell (that is, the cell B) of the terminal device, for example, receive the handover indication of the cell B, and then access the cell A based on the handover indication of the cell B.

S907. The terminal device hands over to the cell A.

For example, the terminal device may hand over to the cell A by activating the secondary carrier. In other words, both the cell A and the cell B may serve the terminal device.

S908. The cell A exits the energy saving state.

After the terminal device accesses the cell A, the cell A may exit the energy saving state. Alternatively, the cell A may determine, based on an actual communication status, whether to exit the energy saving state. For example, the cell A may exit the energy saving state in any one of the following cases: load of the network device (for example, the base station) to which the cell A belongs is greater than a preset third threshold, and a quantity of users accessing the cell A or users of the network device (for example, the base station) to which the cell A belongs is greater than a preset fourth threshold.

The preset third threshold and the preset fourth threshold may be pre-specified, for example, defined in the protocol, may be configured by the network device, or may be empirical values determined based on a historical communication status.

Optionally, after exiting the energy saving state, the cell A recovers sending of the RMSI/OSI/paging message, and the terminal device may access the cell.

In a low-load scenario, sending of SSB, SIB, and paging messages of the cell A occupies a large quantity of downlink sending slots. As a result, the base station cannot save energy in a symbol power saving manner. By implementing the method 900, sending of the SSB, SIB, and paging messages of the cell A may be disabled, and a coordinated energy saving effect can be achieved under coordination of the cell B by using a symbol power saving principle.

FIG. 10 is a schematic flowchart of a communication method applicable to an embodiment of this application. The method 1000 includes the following steps.

S1001. A cell A enters an energy saving state.

For example, the cell A represents a cell at a capacity layer, and a cell B represents a cell at a coverage layer. For still another example, the cell A is a cell in gNB SA/NSA, and the cell B is a cell served by an eNB.

For descriptions of the cell A and the cell B, refer to the descriptions in the method 800. Details are not described herein again.

For example, the cell A may enter the energy saving state in any one of the following cases: load of a network device (for example, a base station) to which the cell A belongs is less than a preset first threshold, and a quantity of users accessing the cell A or users of the network device (for example, the base station) to which the cell A belongs is less than a preset second threshold.

The preset first threshold and the preset second threshold may be pre-specified, for example, defined in a protocol, may be configured by the network device, or may be empirical values determined based on a historical communication status.

Optionally, after entering the energy saving state, the cell A stops sending an RMSI/OSI/paging message; and/or after entering the energy saving state, the cell A sends only an SSB message. A period of the SSB message is prolonged, and a quantity of beams is halved.

The cell B (for example, the cell at the coverage layer) may be responsible for functions of camping and initial access. After accessing the cell B, a terminal device may access the cell A with assistance of the cell B.

S1002. The terminal device performs cell selection.

For example, the terminal device in idle mode performs access selection on a cell. The cell A is in the energy saving state. Therefore, after reading an SSB message of the network device to which the cell A belongs, the terminal device finds that the cell A cannot be camped on.

S1003. The terminal device accesses the cell B.

As described above, the cell A enters the energy saving state. If the terminal device needs to access the cell A, the terminal device may access the cell A with assistance of the cell B.

S1004. The cell B sends inter-RAT measurement indication information to the terminal device, and correspondingly, the terminal device receives the inter-RAT measurement indication information.

The terminal device may perform inter-RAT measurement based on an indication of the cell B.

S1005. The terminal device performs inter-RAT measurement, and sends an inter-RAT measurement result to the cell B.

S1006. The cell B sends handover information to the terminal device.

The cell B may determine, based on the inter-RAT measurement result reported by the terminal device, whether the terminal device needs to hand over to the cell A.

When the cell B determines, based on the inter-RAT measurement result reported by the terminal device, that the terminal device may hand over to the cell A, the cell B may send a handover indication to the terminal device, for example, indicate to perform inter-RAT handover or add a secondary station.

It should be understood that the foregoing is merely an example for description, and this is not limited. For example, the cell B may alternatively determine, based on a size of a to-be-transmitted data volume of the terminal device, whether to send the handover information to the terminal device. For example, when a size of a data volume of the terminal device is greater than a preset threshold, the cell B may send a handover indication to the terminal device, for example, indicate to perform inter-RAT handover or add a secondary station.

It can be learned from the foregoing that, in this embodiment of this application, if the terminal device needs to access the cell A, the terminal device may accept assistance of a serving cell (that is, the cell B) of the terminal device, for example, receive the handover indication of the cell B, and then access the cell A based on the handover indication of the cell B.

S1007. The terminal device hands over to the cell A.

For example, the terminal device may hand over to the cell A by activating the secondary station. In other words, both the cell A and the cell B may serve the terminal device.

S1008. The cell A exits the energy saving state.

After the terminal device accesses the cell A, the cell A may exit the energy saving state. Alternatively, the cell A may determine, based on an actual communication status, whether to exit the energy saving state. For example, the cell A may exit the energy saving state in any one of the following cases: load of the network device (for example, the base station) to which the cell A belongs is greater than a preset seventh threshold, and a quantity of users accessing the cell A or users of the network device (for example, the base station) to which the cell A belongs is greater than a preset eighth threshold.

The preset seventh threshold and the preset eighth threshold may be pre-specified, for example, defined in the protocol, may be configured by the network device, or may be empirical values determined based on a historical communication status.

Optionally, after exiting the energy saving state, the cell A recovers sending of the RMSI/OSI/paging message, and the terminal device may access the cell.

In a low-load scenario, sending of SSB, SIB, and paging messages of the cell A occupies a large quantity of downlink sending slots. As a result, the base station cannot save energy in a symbol power saving manner. By implementing the method 1000, sending of the SSB, SIB, and paging messages of the cell A may be disabled, and a coordinated energy saving effect can be achieved under coordination of the cell B by using a symbol power saving principle.

Embodiments described in this specification may be independent solutions, or may be combined based on internal logic. All these solutions fall within the protection scope of this application.

It should be understood that the steps in the foregoing embodiments are merely possible implementations. This is not limited in embodiments of this application. For example, there is no strict sequence between step 801 and step 802. For another example, there is no strict sequence between step 901 and step 902, or between step 1001 and step 1002.

It may be understood that, in the foregoing method embodiments, methods and operations implemented by the terminal device may alternatively be implemented by a component (for example, a chip or a circuit) that may be used in the terminal device, and methods and operations implemented by the network device (for example, the cell A or the network device to which the cell A belongs) may alternatively be implemented by a component (for example, a chip or a circuit) that may be used in the network device.

The foregoing mainly describes the solutions provided in embodiments of this application from a perspective of interaction. It may be understood that, to implement the foregoing functions, each network element, such as a transmitting end device or a receiving end device, includes a corresponding hardware structure and/or software module for performing each function. A person skilled in the art may be aware that, with reference to the examples described in embodiments disclosed in this specification, units and algorithm steps can be implemented by hardware or a combination of computer software and hardware in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, the transmitting end device or the receiving end device may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that division into the modules in embodiments of this application is an example and is merely logical function division. During actual implementation, there may be another division manner. An example in which each functional module is obtained through division based on a corresponding function is used below for description.

The foregoing describes in detail the methods provided in embodiments of this application with reference to FIG. 8 to FIG. 10. The following describes in detail apparatuses provided in embodiments of this application with reference to FIG. 11 to FIG. 14. It should be understood that descriptions of the apparatus embodiments correspond to the descriptions of the method embodiments. Therefore, for content that is not described in detail, refer to the foregoing method embodiments. For brevity, details are not described herein again.

Figure 11:
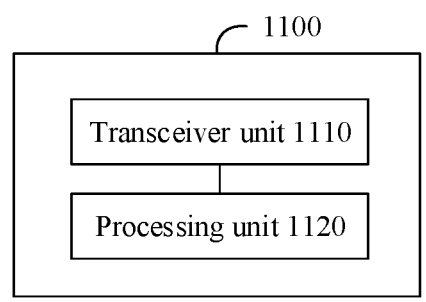
FIG. 11 is a schematic block diagram of a communication apparatus applicable to an embodiment of this application.

FIG. 11 is a schematic block diagram of a communication apparatus according to an embodiment of this application. The communication apparatus 1100 includes a transceiver unit 1110 and a processing unit 1120. The transceiver unit 1110 may implement a corresponding communication function, and the processing unit 1110 is configured to process data. The transceiver unit 1110 may also be referred to as a communication interface or a communication unit.

Optionally, the communication apparatus 1100 may further include a storage unit. The storage unit may be configured to store instructions and/or data. The processing unit 1120 may read the instructions and/or the data in the storage unit, so that the communication apparatus implements the foregoing method embodiments.

The communication apparatus 1100 may be configured to perform actions performed by the terminal device in the foregoing method embodiments. In this case, the communication apparatus 1100 may be a terminal device or a component that may be configured in the terminal device. The transceiver unit 1110 is configured to perform transceiver-related operations on a terminal device side in the foregoing method embodiments. The processing unit 1120 is configured to perform processing-related operations on the terminal device side in the foregoing method embodiments.

Alternatively, the communication apparatus 1100 may be configured to perform actions performed by the cell A (or the network device to which the cell A belongs) in the foregoing method embodiments. In this case, the communication apparatus 1100 may be the cell A (or the network device to which the cell A belongs) or a component that may be configured in the cell A (or the network device to which the cell A belongs). The transceiver unit 1110 is configured to perform transceiver-related operations on a side of the cell A (or the network device to which the cell A belongs) in the foregoing method embodiments. The processing unit 1120 is configured to perform processing-related operations on the side of the cell A (or the network device to which the cell A belongs) in the foregoing method embodiments.

Alternatively, the communication apparatus 1100 may be configured to perform actions performed by the cell A (or the network device to which the cell A belongs) and the cell B (or the network device to which the cell B belongs) in the foregoing method embodiments. The transceiver unit 1110 is configured to perform transceiver-related operations on sides of the cell A (or the network device to which the cell A belongs) and the cell B (or the network device to which the cell B belongs) in the foregoing method embodiments. The processing unit 1120 is configured to perform processing-related operations on the side of the cell A (or the network device to which the cell A belongs) and the cell B (or the network device to which the cell B belongs) in the foregoing method embodiments.

In a design, the communication apparatus 1100 is configured to perform actions performed by the terminal device in the foregoing method embodiments. In a possible implementation, the processing unit 1120 is configured to enable the communication apparatus 1100 to access a cell in a second frequency range. When the communication apparatus 1100 needs to access a cell in a first frequency range, and the cell in the first frequency range is in an energy saving state, the processing unit 1120 is configured to enable the communication apparatus 1100 to access the cell in the first frequency range with assistance of the cell in the second frequency range. When the cell in the first frequency range is in the energy saving state, the cell in the first frequency range does not support functions of camping and initial access.

For example, the transceiver unit 1110 is configured to receive a handover indication from the cell in the second frequency range, and the processing unit 1120 is configured to hand over to the cell in the first frequency range based on the handover indication.

The communication apparatus 1100 may implement steps or procedures performed by the terminal device in the method 800, the method 900, and the method 1000 according to embodiments of this application. The communication apparatus 1100 may include units configured to perform methods performed by the terminal device in the method 800 in FIG. 8, the method 900 in FIG. 9, and the method 1000 in FIG. 10. In addition, the units in the communication apparatus 1100 and the foregoing other operations and/or functions are separately intended to implement corresponding procedures in the method 800 in FIG. 8, the method 900 in FIG. 9, and the method 1000 in FIG. 10.

When the communication apparatus 1100 is configured to perform the method 800) in FIG. 8, the transceiver unit 1110 may be configured to perform step S803 in the method 800, and the processing unit 1120 may be configured to perform step S802 in the method 800.

When the communication apparatus 1100 is configured to perform the method 900 in FIG. 9, the transceiver unit 1110 may be configured to perform steps S904 to S906 in the method 900, and the processing unit 1120 may be configured to perform steps S902, S903, and S907 in the method 900.

When the communication apparatus 1100 is configured to perform the method 1000 in FIG. 10, the transceiver unit 1110 may be configured to perform steps S1004 to S1006 in the method 1000, and the processing unit 1120 may be configured to perform steps S1002, S1003, and S1107 in the method 1000.

It should be understood that a specific process in which the units perform the foregoing corresponding steps is described in detail in the foregoing method embodiments. For brevity, details are not described herein again.

In another design, the communication apparatus 1100 is configured to perform actions performed by the cell A (or the network device to which the cell A belongs) in the foregoing method embodiments. In a possible implementation, the processing unit 1120 is configured to determine to enter an energy saving state; and when the terminal device needs to access the communication apparatus 1100, a cell in a second frequency range assists the communication apparatus 1100, so that the terminal device accesses the communication apparatus 1100.

For example, after the communication apparatus 1100 enters the energy saving state, the communication apparatus 1100 does not support functions of camping and initial access.

The communication apparatus 1100 may implement steps or procedures performed by the cell A (or the network device to which the cell A belongs) in the method 800, the method 900, and the method 1100 according to embodiments of this application. The communication apparatus 1100 may include units configured to perform methods performed by the cell A (or the network device to which the cell A belongs) in the method 800 in FIG. 8, the method 900 in FIG. 9, and the method 1000 in FIG. 10. In addition, the units in the communication apparatus 1100 and the foregoing other operations and/or functions are separately intended to implement corresponding procedures in the method 800 in FIG. 8, the method 900 in FIG. 9, and the method 1000 in FIG. 10.

When the communication apparatus 1100 is configured to perform the method 800 in FIG. 8, the processing unit 1120 may be configured to perform steps S801 and S803 in the method 800.

When the communication apparatus 1100 is configured to perform the method 900 in FIG. 9, the processing unit 1120 may be configured to perform steps S901, S907, and S908 in the method 900.

When the communication apparatus 1100 is configured to perform the method 1000 in FIG. 10, the processing unit 1020 may be configured to perform steps S1001, S1007, and S1008 in the method 1000.

It should be understood that a specific process in which the units perform the foregoing corresponding steps is described in detail in the foregoing method embodiments. For brevity, details are not described herein again.

In still another design, the communication apparatus 1100 is configured to perform actions performed by the cell A (or the network device to which the cell A belongs) and the cell B (or the network device to which the cell B belongs) in the foregoing method embodiments. In a possible implementation, the processing unit 1120 is configured to determine that the cell A (or the network device to which the cell A belongs) enters an energy saving state; and when the terminal device needs to access the cell A (or the network device to which the cell A belongs), the cell B (or the network device to which the cell B belongs) assists the cell A (or the network device to which the cell A belongs), so that the terminal device accesses the cell A (or the network device to which the cell A belongs).

For example, that the processing unit 1120 determines that the cell A (or the network device to which the cell A belongs) enters an energy saving state includes: The cell A (or the network device to which the cell A belongs) does not support functions of camping and initial access.

For another example, the transceiver unit 1110 is configured to send a handover indication to the terminal device, to indicate the terminal device to hand over to a cell in a first frequency range.

For still another example, a cell in a second frequency range adds the cell in the first frequency range as a secondary cell or a secondary carrier.

When the communication apparatus 1100 is configured to perform the method 800 in FIG. 8, the transceiver unit 1110 may be configured to perform step S803 in the method 800, and the processing unit 1120 may be configured to perform steps S801 and S802 in the method 1100.

When the communication apparatus 1100 is configured to perform the method 900 in FIG. 9, the transceiver unit 1110 may be configured to perform steps S904 to S906 in the method 900, and the processing unit 1120 may be configured to perform steps S901, S903, S907, and S908 in the method 900.

When the communication apparatus 1100 is configured to perform the method 1000 in FIG. 10, the transceiver unit 1110 may be configured to perform steps S1004 to S1006 in the method 1100, and the processing unit 1120 may be configured to perform steps S1001, S1003, S1007, and S1008 in the method 1000.

It should be understood that a specific process in which the units perform the foregoing corresponding steps is described in detail in the foregoing method embodiments. For brevity, details are not described herein again.

The processing unit 1120 in the foregoing embodiment may be implemented by at least one processor or a processor-related circuit. The transceiver unit 1110 may be implemented by a transceiver or a transceiver-related circuit. The transceiver unit 1110 may also be referred to as a communication unit or a communication interface. The storage unit may be implemented by at least one memory.

Figure 12:
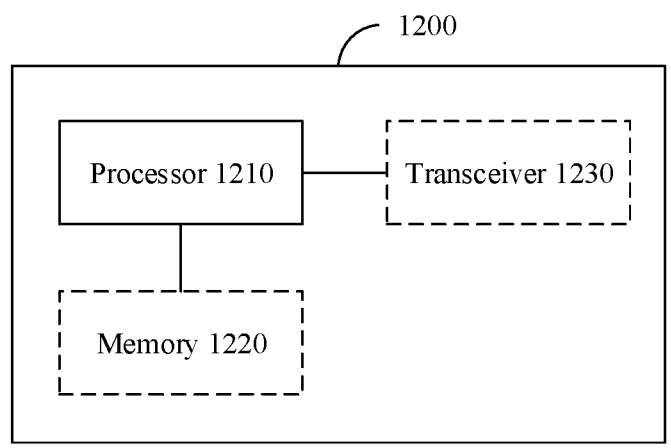
FIG. 12 is a schematic diagram of an architecture of a communication apparatus applicable to an embodiment of this application.

As shown in FIG. 12, an embodiment of this application further provides a communication apparatus 1200. The communication apparatus 1200 includes a processor 1210. The processor 1210 is coupled to a memory 1220. The memory 1220 is configured to store a computer program or instructions and/or data. The processor 1210 is configured to execute the computer program or the instructions and/or data stored in the memory 1220, so that the methods in the foregoing method embodiments are performed.

Optionally, the communication apparatus 1200 includes one or more processors 1210.

Optionally, as shown in FIG. 12, the communication apparatus 1200 may further include the memory 1220.

Optionally, the communication apparatus 1200 may include one or more memories 1220.

Optionally, the memory 1220 and the processor 1210 may be integrated together, or disposed separately.

Optionally, as shown in FIG. 12, the communication apparatus 1200 may further include a transceiver 1230, and the transceiver 1230 is configured to receive and/or send a signal. For example, the processor 1210 is configured to control the transceiver 1230 to receive and/or send a signal.

In a solution, the communication apparatus 1200 is configured to perform operations performed by the terminal device in the foregoing method embodiments.

For example, the processor 1210 is configured to implement processing-related operations performed by the terminal device in the foregoing method embodiments, and the transceiver 1230 is configured to implement transceiver-related operations performed by the terminal device in the foregoing method embodiments.

In another solution, the communication apparatus 1200 is configured to perform operations performed by the network device in the foregoing method embodiments.

For example, the processor 1210 is configured to implement processing-related operations performed by the network device in the foregoing method embodiments, and the transceiver 1230 is configured to implement transceiver-related operations performed by the network device in the foregoing method embodiments.

An embodiment of this application further provides a communication apparatus 1300. The communication apparatus 1300 may be a terminal device or a chip. The communication apparatus 1300 may be configured to perform operations performed by the terminal device in the foregoing method embodiments.

Figure 13:
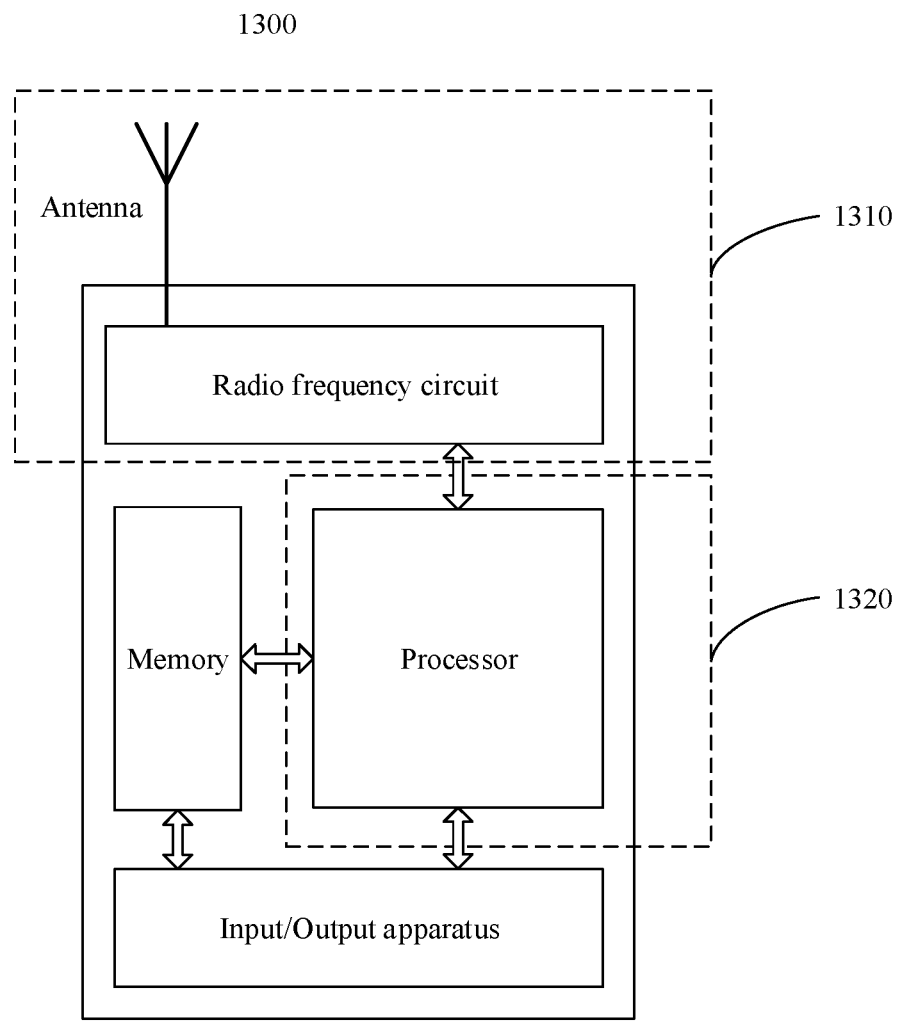
FIG. 13 is a schematic diagram of a structure of a communication apparatus applicable to an embodiment of this application.

When the communication apparatus 1300 is a terminal device, FIG. 13 is a simplified schematic diagram of a structure of the terminal device. As shown in FIG. 13, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display screen, and a keyboard, is mainly configured to: receive data input by a user and output data to the user. It should be noted that terminal devices of some types may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 13 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device.

As shown in FIG. 13, the terminal device includes a transceiver unit 1310 and a processing unit 1320. The transceiver unit 1310 may also be referred to as a transceiver, a transceiver machine, a transceiver apparatus, or the like. The processing unit 1320 may also be referred to as a processor, a processing board, a processing module, a processing apparatus, or the like.

Optionally, a component for implementing a receiving function in the transceiver unit 1310 may be considered as a receiving unit, and a component for implementing a sending function in the transceiver unit 1310 may be considered as a sending unit. In other words, the transceiver unit 1310 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the processing unit 1320 is configured to perform processing actions on a terminal device side in FIG. 8. For example, the processing unit 1320 is configured to perform the processing step in step S802 in FIG. 8, and the transceiver unit 1310 is configured to perform the transceiver operations in step S803 in FIG. 8.

For another example, in an implementation, the processing unit 1320 is configured to perform the processing steps in steps S902, S903, and S907 in FIG. 9, and the transceiver unit 1310 is configured to perform the transceiver operations in steps S904 to S906 in FIG. 9.

For another example, in an implementation, the processing unit 1320 is configured to perform the processing steps in steps S1002, S1003, and S1007 in FIG. 10, and the transceiver unit 1310 is configured to perform the transceiver operations in steps S1004 to S1006 in FIG. 11.

It should be understood that FIG. 13 is merely an example instead of a limitation. The terminal device including the transceiver unit and the processing unit may not depend on the structure shown in FIG. 13.

When the communication apparatus 1300 is a chip, the chip includes a transceiver unit and a processing unit. The transceiver unit may be an input/output circuit or a communication interface. The processing unit may be a processor, a microprocessor, or an integrated circuit that is integrated on the chip.

An embodiment of this application further provides a communication apparatus 1400. The communication apparatus 1400 may be a network device (a cell A (or a network device to which the cell A belongs) or a cell B (or a network device to which the cell B belongs)), or may be a chip. The communication apparatus 1400 may be configured to perform operations performed by the network device in the foregoing method embodiments.

Figure 14:
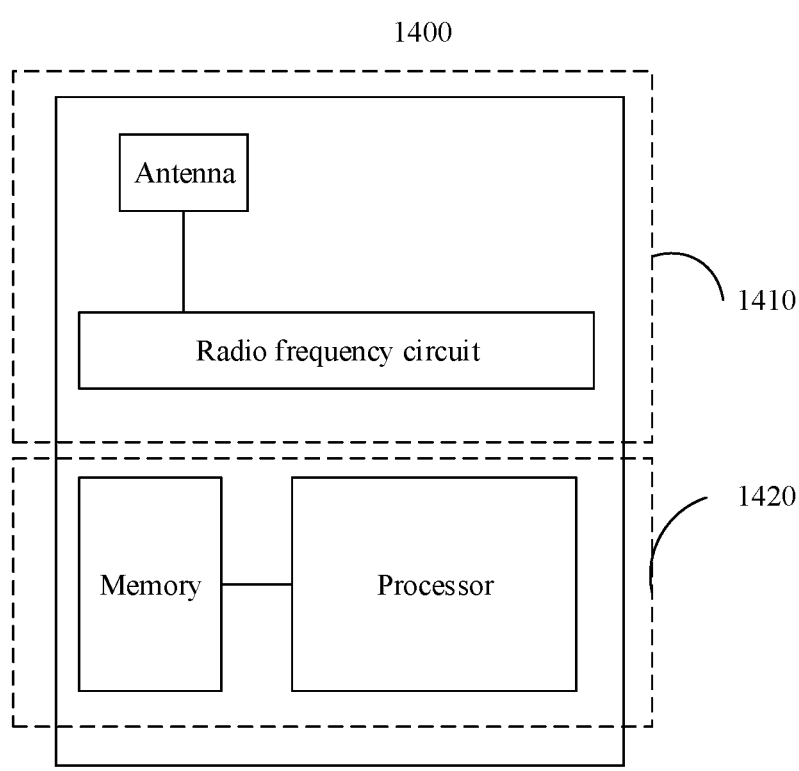
FIG. 14 is a schematic diagram of an architecture of a communication apparatus applicable to an embodiment of this application.

When the communication apparatus 1400 is a network device, for example, a base station, FIG. 14 is a simplified schematic diagram of an architecture of the base station. The base station includes a part 1410 and a part 1420. The part 1410 is mainly configured to: receive and transmit a radio frequency signal, and perform conversion between the radio frequency signal and a baseband signal. The part 1420 is mainly configured to: perform baseband processing, control the base station, and the like. The part 1410 may be usually referred to as a transceiver unit, a transceiver machine, a transceiver circuit, a transceiver, or the like. The part 1420 is usually a control center of the base station, may be usually referred to as a processing unit, and is configured to control the base station to perform processing operations on a network device side in the foregoing method embodiments.

The transceiver unit in the part 1410 may also be referred to as a transceiver, a transceiver machine, or the like, and includes an antenna and a radio frequency circuit. The radio frequency circuit is mainly configured to perform radio frequency processing. Optionally, a component for implementing a receiving function in the part 1410 may be considered as a receiving unit, and a component for implementing a sending function may be considered as a sending unit. In other words, the part 1410 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 1420 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, a plurality of boards may share one or more processors, a plurality of boards may share one or more memories, or a plurality of boards may simultaneously share one or more processors.

For example, in an implementation, the transceiver unit in the part 1410 is configured to perform transceiver-related steps performed by the network device in the embodiment shown in FIG. 8. The part 1420 is configured to perform processing-related steps performed by the network device in the embodiment shown in FIG. 8.

For example, in another implementation, the transceiver unit in the part 1410 is configured to perform transceiver-related steps performed by the network device in the embodiment shown in FIG. 9. The part 1420 is configured to perform processing-related steps performed by the network device in the embodiment shown in FIG. 9.

For example, in still another implementation, the transceiver unit in the part 1410 is configured to perform transceiver-related steps performed by the network device in the embodiment shown in FIG. 10. The part 1420 is configured to perform processing-related steps performed by the network device in the embodiment shown in FIG. 10.

It should be understood that FIG. 14 is merely an example instead of a limitation. The network device including the transceiver unit and the processing unit may not depend on the structure shown in FIG. 14.

When the communication apparatus 1400 is a chip, the chip includes a transceiver unit and a processing unit. The transceiver unit may be an input/output circuit or a communication interface. The processing unit is a processor, a microprocessor, or an integrated circuit that is integrated on the chip.

An embodiment of this application further provides a computer-readable storage medium. The computer-readable storage medium stores computer instructions used to implement the method performed by the terminal device or the method performed by the network device in the foregoing method embodiments.

For example, when the computer program is executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the network device and the terminal device in the foregoing embodiments.

It may be clearly understood by a person skilled in the art that, for convenience and brief description, for explanations and beneficial effects of related content in any communication apparatus provided above, refer to the corresponding method embodiment provided above. Details are not described herein again.

In embodiments of this application, the terminal device or the network device may include a hardware layer, an operating system layer running on the hardware layer, and an application layer running on the operating system layer. The hardware layer may include hardware such as a central processing unit (central processing unit, CPU), a memory management unit (memory management unit, MMU), and a memory (which is also referred to as a main memory). An operating system of the operating system layer may be any one or more computer operating systems that implement service processing by using a process (process), for example, a Linux operating system, a Unix operating system, an Android operating system, an iOS operating system, or a Windows operating system. The application layer may include applications such as a browser, an address book, word processing software, and instant communication software.

A specific structure of an execution body of the method provided in embodiments of this application is not specifically limited in embodiments of this application, provided that a program that records code for the method provided in embodiments of this application can be run to perform communication according to the method provided in embodiments of this application. For example, the method provided in embodiments of this application may be performed by the terminal device or the network device, or may be performed by a functional module that is in the terminal device or the network device and that can invoke and execute a program.

Aspects or features of this application may be implemented as a method, an apparatus or a product that uses standard programming and/or engineering technologies. The term "product" used in this specification may cover a computer program that can be accessed from any computer-readable component, carrier or medium.

The computer-readable storage medium may be any usable medium accessible to a computer, or a data storage device, such as a server or a data center, integrating one or more usable media. The usable medium (or the computer-readable medium) may include, for example, but is not limited to, various media that can store program code such as a magnetic medium or a magnetic storage device (for example, a floppy disk, a hard disk (for example, a removable hard disk), or a magnetic tape), an optical medium (for example, an optical disc, a compact disc (CD), or a digital versatile disc (DVD)), a smart card, and a flash memory device (for example, an erasable programmable read-only memory (EPROM), a card, a stick, or a key drive), or a semiconductor medium (for example, a solid state disk (SSD), a USB flash drive, a read-only memory (ROM), or a random access memory (RAM)).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that the processor mentioned in embodiments of this application may be a central processing unit (CPU), or may be another general-purpose processor, a digital signal processor (DSP), an application specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM. EPROM), an electrically erasable programmable read-only memory (electrically EPROM. EEPROM), or a flash memory. The volatile memory may be a random access memory (RAM). For example, the RAM may be used as an external cache. By way of example but not limitation, the RAM may include the following plurality of forms: a static random access memory (static RAM. SRAM), a dynamic random access memory (dynamic RAM. DRAM), a synchronous dynamic random access memory (synchronous DRAM. SDRAM), a double data rate synchronous dynamic random access memory (double data rate SDRAM, DDR SDRAM), an enhanced synchronous dynamic random access memory (enhanced SDRAM. ESDRAM), a synchlink dynamic random access memory (synchlink DRAM. SLDRAM), and a direct rambus dynamic random access memory (direct rambus RAM. DR RAM).

It should be noted that when the processor is a general-purpose processor, a DSP, an ASIC, an FPGA, or another programmable logic device, a discrete gate or a transistor logic device, or a discrete hardware component, the memory (storage module) may be integrated into the processor.

It should be further noted that the memory described in this specification is intended to include, but is not limited to, these memories and any other memory of a suitable type.

In the several embodiments provided in this application, it should be understood that the disclosed apparatus and method may be implemented in another manner. For example, the foregoing apparatus embodiments are only examples. For example, division into the foregoing units is only logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The foregoing units described as separate parts may or may not be physically separate, and parts displayed as units may or may not be physical units, may be located in one place, or may be distributed on a plurality of network units. Some or all of the units may be selected based on actual requirements to implement the solutions provided in this application.

In addition, functional units in embodiments of this application may be integrated into one unit, or each of the units may exist alone physically, or two or more units may be integrated into one unit.

All or some of the foregoing embodiments may be implemented by using software, hardware, firmware, or any combination thereof.

When software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:
1. A communication method, comprising:
   determining, by a cell in a first frequency range, to enter an energy saving state; and
   when the cell in the first frequency range is in the energy saving state and a terminal device needs to access the cell in the first frequency range, assisting, by a cell in a second frequency range, the cell in the first frequency range, so that the terminal device accesses the cell in the first frequency range, wherein an energy saving state comprises, the cell in the first frequency range does not enable a camping function and does not enable an initial access function.
2. The method according to claim 1, wherein the assisting, by a cell in a second frequency range, the cell in the first frequency range, so that the terminal device accesses the cell in the first frequency range comprises:
   sending, by the cell in the second frequency range, a handover indication to the terminal device, to indicate the terminal device to hand over to the cell in the first frequency range.
3. The method according to claim 1, wherein the assisting, by a cell in a second frequency range, the cell in the first frequency range, so that the terminal device accesses the cell in the first frequency range comprises:
   adding, by the cell in the second frequency range, the cell in the first frequency range as one of a secondary cell or a secondary carrier.
4. A communication method, comprising:
   accessing, by a terminal device, a cell in a second frequency range; and
   when the terminal device needs to access a cell in a first frequency range, and the cell in the first frequency range is in an energy saving state, accessing, by the terminal device, the cell in the first frequency range with assistance of the cell in the second frequency range, wherein
   when the cell in the first frequency range is in the energy saving state, the cell in the first frequency range does not enable a camping function and does not enable an initial access function.
5. The method according to claim 4, wherein the accessing, by the terminal device, the cell in the first frequency range with assistance of the cell in the second frequency range comprises:
   receiving, by the terminal device, a handover indication from the cell in the second frequency range, and handing over, by the terminal device, to the cell in the first frequency range based on the handover indication.

* * * * *